US012029329B2

(12) United States Patent
Suzuki

(10) Patent No.: US 12,029,329 B2
(45) Date of Patent: Jul. 9, 2024

(54) STORAGE MECHANISM FOR SEAT TABLE

(71) Applicant: TOYOTA BOSHOKU KABUSHIKI KAISHA, Aichi (JP)

(72) Inventor: Hiroyuki Suzuki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 83 days.

(21) Appl. No.: 18/073,192

(22) Filed: Dec. 1, 2022

(65) Prior Publication Data

US 2023/0172362 A1 Jun. 8, 2023

(30) Foreign Application Priority Data

Dec. 3, 2021 (JP) ................................. 2021-197037

(51) Int. Cl.

| | |
|---|---|
| ***A47C 7/68*** | (2006.01) |
| ***A47C 7/54*** | (2006.01) |
| ***A61G 5/10*** | (2006.01) |
| *A47D 1/00* | (2006.01) |

(52) U.S. Cl.

CPC ................ *A47C 7/705* (2018.08); *A47C 7/54* (2013.01); *A47D 1/0083* (2017.05); *A47D 1/0085* (2017.05); *A61G 5/1094* (2016.11)

(58) Field of Classification Search

CPC .... A47C 7/705; A47D 1/0083; A47D 1/0085; A61G 5/1094

USPC ..................... 297/148, 153, 154, 155, 174 R

See application file for complete search history.

(56) References Cited

U.S. PATENT DOCUMENTS

| | | | | | |
|---|---|---|---|---|---|
| 845,222 | A * | 2/1907 | David | A47C 7/705 | 297/148 |
| 2,022,955 | A * | 12/1935 | Davis | A47C 7/70 | 297/153 |
| 2,453,007 | A * | 11/1948 | Flatt | A47C 7/705 | 248/247 |
| 2,555,130 | A * | 5/1951 | Harles | A47C 7/70 | 297/149 |
| 2,865,432 | A * | 12/1958 | Dearing | A47C 7/705 | 297/153 X |
| 3,220,025 | A * | 11/1965 | Nelson | A47B 23/02 | 108/49 |
| 5,160,183 | A * | 11/1992 | Rusyniak | A47C 7/624 | 297/153 X |

(Continued)

FOREIGN PATENT DOCUMENTS

| | | | | |
|---|---|---|---|---|
| AT | 353834 B | * 12/1979 | A47C 7/70 |
| DE | 2723149 A | * 11/1978 | A47C 7/70 |

(Continued)

*Primary Examiner* — Rodney B White

(74) *Attorney, Agent, or Firm* — GREENBLUM & BERNSTEIN, P.L.C.

(57) ABSTRACT

Provided is a storage mechanism for a seat table enabling improved handleability at the time of storage with a relatively simple configuration. One aspect of the present disclosure is a storage mechanism for a seat table used by combination with a seat. The storage mechanism for the seat table includes a held portion provided to the seat table, and a holding portion provided to a storage portion where the seat table is stored. The held portion includes at least one attracted magnet. The holding portion includes at least one attracting magnet attracting the at least one attracted magnet, and at least one repelling magnet repelling the at least one attracted magnet.

5 Claims, 5 Drawing Sheets

(56) References Cited

U.S. PATENT DOCUMENTS

| | | | | |
|---|---|---|---|---|
| 8,079,553 | B1 * | 12/2011 | Martin | A47C 7/705 297/153 X |
| 8,113,128 | B2 * | 2/2012 | Lee | A47C 7/705 108/42 |
| 8,347,791 | B1 * | 1/2013 | Gray | A47C 7/70 297/153 X |
| 10,583,787 | B1 * | 3/2020 | Toledo | B60R 11/00 |
| 10,703,297 | B1 * | 7/2020 | Cohen | B60N 3/103 |
| 2005/0092212 | A1 * | 5/2005 | Simon | B60N 2/26 108/43 |
| 2006/0202523 | A1 * | 9/2006 | Wells | A47C 7/705 297/148 |
| 2007/0029848 | A1 * | 2/2007 | Probst | B60N 2/28 297/148 |
| 2008/0041282 | A1 * | 2/2008 | Goschy | A61G 5/1054 108/44 |
| 2015/0265059 | A1 * | 9/2015 | Qiao | A47C 7/624 108/42 |
| 2018/0325262 | A1 * | 11/2018 | Richardson | A47C 31/008 |
| 2020/0139865 | A1 * | 5/2020 | Weinberger | F16H 19/04 |
| 2021/0085094 | A1 * | 3/2021 | Rosenthal | A47D 1/004 |
| 2022/0277875 | A1 * | 9/2022 | Lamoureux | B60N 3/102 |
| 2023/0248152 | A1 * | 8/2023 | Li | A47C 7/622 297/153 |

FOREIGN PATENT DOCUMENTS

| | | | | | |
|---|---|---|---|---|---|
| FR | 1538543 | A | * | 9/1968 | A47C 7/705 |
| FR | 3023515 | A1 | * | 1/2016 | B60N 2/4613 |
| GB | 437963 | A | * | 11/1935 | A47C 7/705 |
| GB | 2095988 | A | * | 10/1982 | A47C 7/70 |
| GB | 2206488 | A | * | 1/1989 | A47C 7/68 |
| JP | 2016-132287 | | | 7/2016 | |
| JP | 2020-66343 | | | 4/2020 | |
| KR | 20110003460 | U | * | 4/2011 | A47C 7/705 |
| KR | 200455409 | Y1 | * | 9/2011 | A47C 7/705 |

* cited by examiner

STORAGE MECHANISM FOR SEAT TABLE

CROSS-REFERENCE TO RELATED APPLICATIONS

This application claims the benefit of Japanese Patent Application No. 2021-197037 filed on Dec. 3, 2021 with the Japan Patent Office, the entire disclosure of which is incorporated herein by reference.

BACKGROUND

The present disclosure relates to a storage mechanism for a seat table.

A seat table is known that an occupant can use by setting it up to a seat from a state where the seat table is stored in a storage portion in the vicinity of the seat (see Japanese Unexamined Patent Application Publication No. 2016-132287 and Japanese Unexamined Patent Application Publication No. 2020-66343). Such a seat table is configured to be stored in the storage portion again after being used.

SUMMARY

The seat table disclosed in Japanese Unexamined Patent Application Publication No. 2016-132287 requires component parts for storing it in the storage portion, thus imposing restrictions on the size, arrangement, etc., of the seat table. Further, the seat table disclosed in Japanese Unexamined Patent Application Publication No. 2020-66343 requires alignment with grooves arranged on the storage portion, thus hindering easy handling for storage.

In one aspect of the present disclosure, it is desirable to provide a storage mechanism for a seat table enabling improved handleability at the time of storage with a relatively simple configuration.

One aspect of the present disclosure is a storage mechanism for a seat table used by combination with a seat. The storage mechanism for the seat table comprises a held portion provided to the seat table, and a holding portion provided to a storage portion where the seat table is stored.

The held portion comprises at least one attracted magnet. The holding portion comprises at least one attracting magnet attracting the at least one attracted magnet, and at least one repelling magnet repelling the at least one attracted magnet.

In such a configuration, mutual attraction between the at least one attracted magnet and the at least one attracting magnet results in guiding the held portion of the seat table to a storage position in the storage portion. Additionally, mutual repellence between the at least one attracted magnet and the at least one repelling magnet results in guiding the at least one attracted magnet toward the at least one attracting magnet. This enables improved handleability in storing the seat table in the storage portion with a relatively simple configuration.

In one aspect of the present disclosure, the held portion may further comprise a metal part attracted to the at least one repelling magnet in a state where the held portion is held by the holding portion. In such a configuration, attraction of the metal part to the at least one repelling magnet makes it possible to increase a force to hold the held portion by the holding portion.

In one aspect of the present disclosure, the at least one attracting magnet may comprise a first attracting magnet and a second attracting magnet arranged so as to be apart from each other in a first direction. The at least one attracted magnet may comprise a first attracted magnet and a second attracted magnet. The first attracted magnet and the second attracted magnet are attracted to the first attracting magnet and the second attracting magnet, respectively, in the state where the held portion is held by the holding portion. The holding portion may comprise a protruding portion that is arranged between the first attracting magnet and the second attracting magnet in the first direction and that protrudes toward the held portion relative to the first attracting magnet and the second attracting magnet as viewed in the state where the held portion is held by the holding portion. The at least one repelling magnet may be arranged in the protruding portion. Such a configuration makes it possible to enhance the effect of guiding the at least one attracted magnet toward the at least one attracting magnet by mutual repellence between the at least one attracted magnet and the at least one repelling magnet.

In one aspect of the present disclosure, the storage portion may be provided to the seat. Such a configuration makes it possible to design the held portion and the holding portion in parallel with designing the seat and the seat table.

In one aspect of the present disclosure, the storage portion may be an armrest of the seat. Such a configuration facilitates storage and take-off of the seat table while an occupant is seated. Additionally, a lower space of the armrest can be utilized effectively.

BRIEF DESCRIPTION OF THE DRAWINGS

An example embodiment to which the present disclosure is applied will be described below with reference to the accompanying drawings, in which.

DETAILED DESCRIPTION OF EXEMPLARY EMBODIMENTS

1. First Embodiment

[1-1. Configuration]

Figure 1:
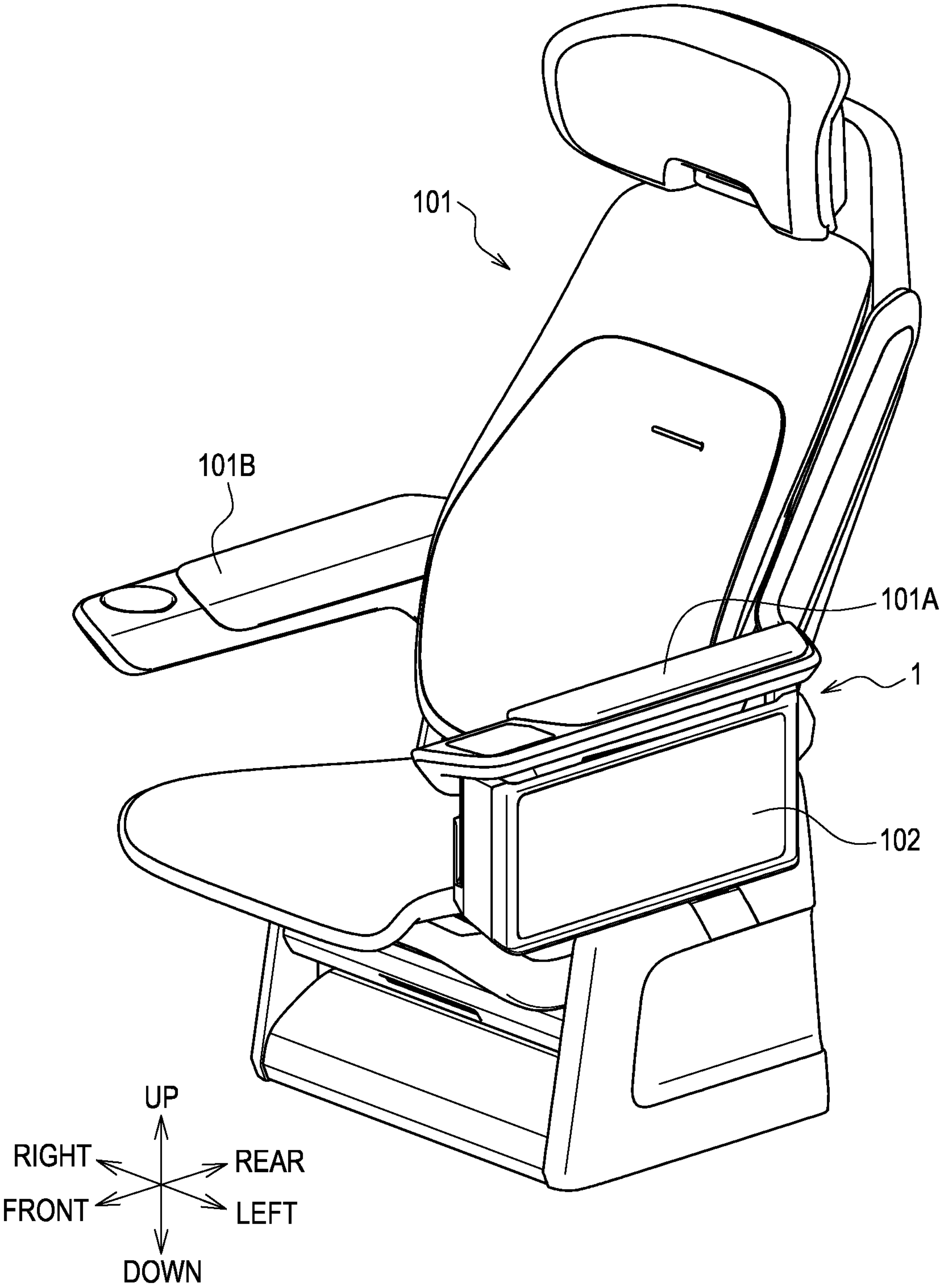
FIG. 1 is a schematic perspective view showing a seat, a seat table, and a storage mechanism for the seat table according to an embodiment.

A seat table storage mechanism 1 shown in FIG. 1 is a mechanism for storing a seat table 102 used by combination with a seat 101. The seat table storage mechanism 1 comprises a held portion 2 provided to the seat table 102, and a holding portion 3 provided to a first armrest 101A.

Figure 2:
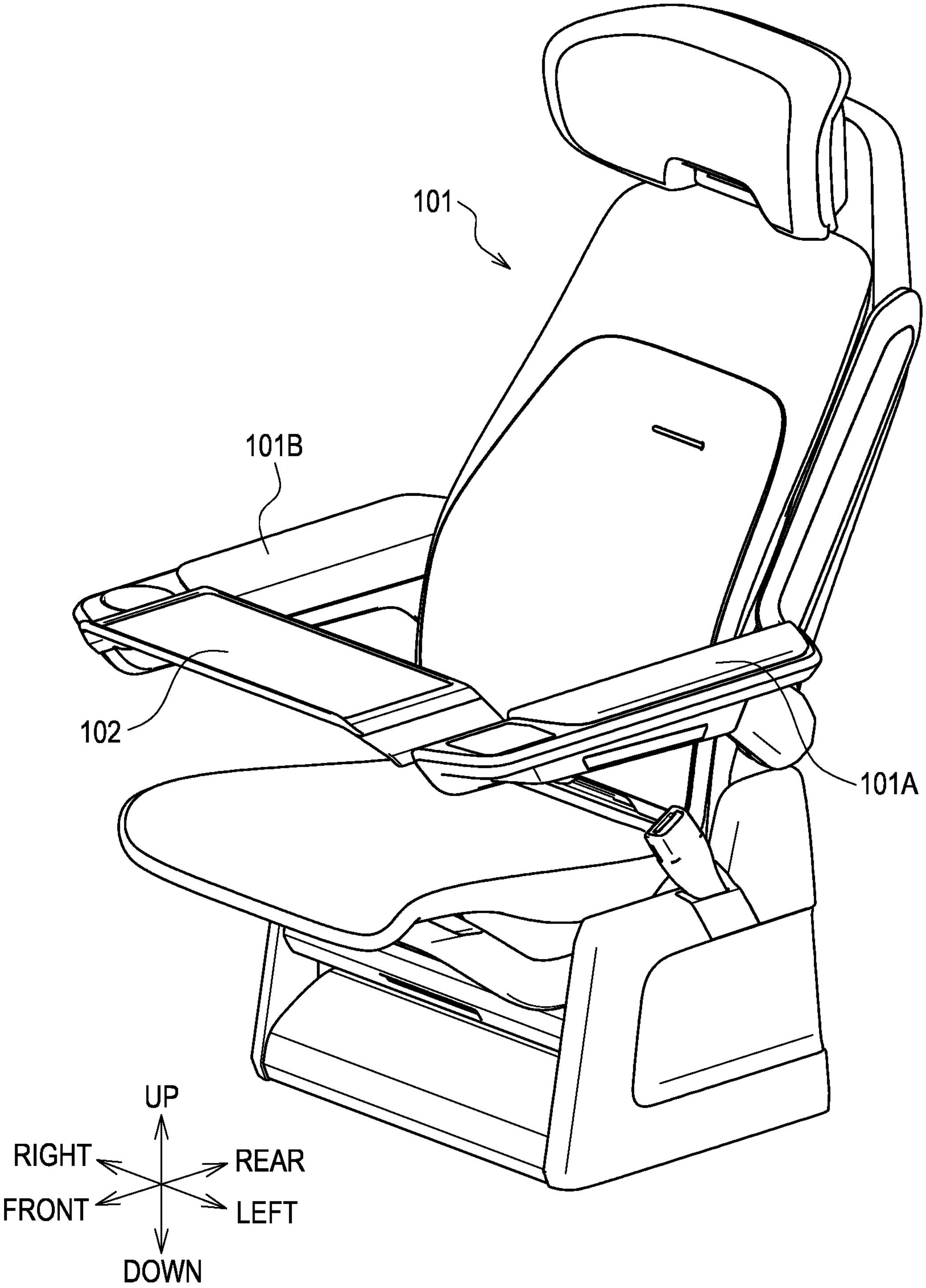
FIG. 2 is a schematic perspective view showing an in-use state of the seat table in FIG. 1.

The seat table 102 is configured to be attachable to and detachable from the first armrest 101A, at a storage position set in the first armrest 101A. The seat table 102 can be moved, manually by an occupant, so as to be shifted from a storage state shown in FIG. 1, in which it is stored in the first armrest 101A of the seat 101, to an in-use state shown in FIG. 2.

In the in-use state, the seat table 102 is mounted so as to spread over the first armrest 101A and a second armrest 101B of the seat 101. In other words, the seat table 102 can be arranged on the first armrest 101A and on the second armrest 101B.

The seat 101 is, for example, a seat used in vehicles, such as automobiles, railroad vehicles, ships, or aircraft. Also, the seat 101 may be a seat arranged in facilities such as movie theaters or theaters.

The first armrest 101A and the second armrest 101B of the seat 101 support arms of the occupant. The first armrest 101A is arranged to the left of the second armrest 101B. However, the first armrest 101A may be arranged to the right of the second armrest 101B. That is, the seat table 102 may be stored in an armrest on the left side or may be stored in an armrest on the right side.

<Seat Table>

Figure 3A:
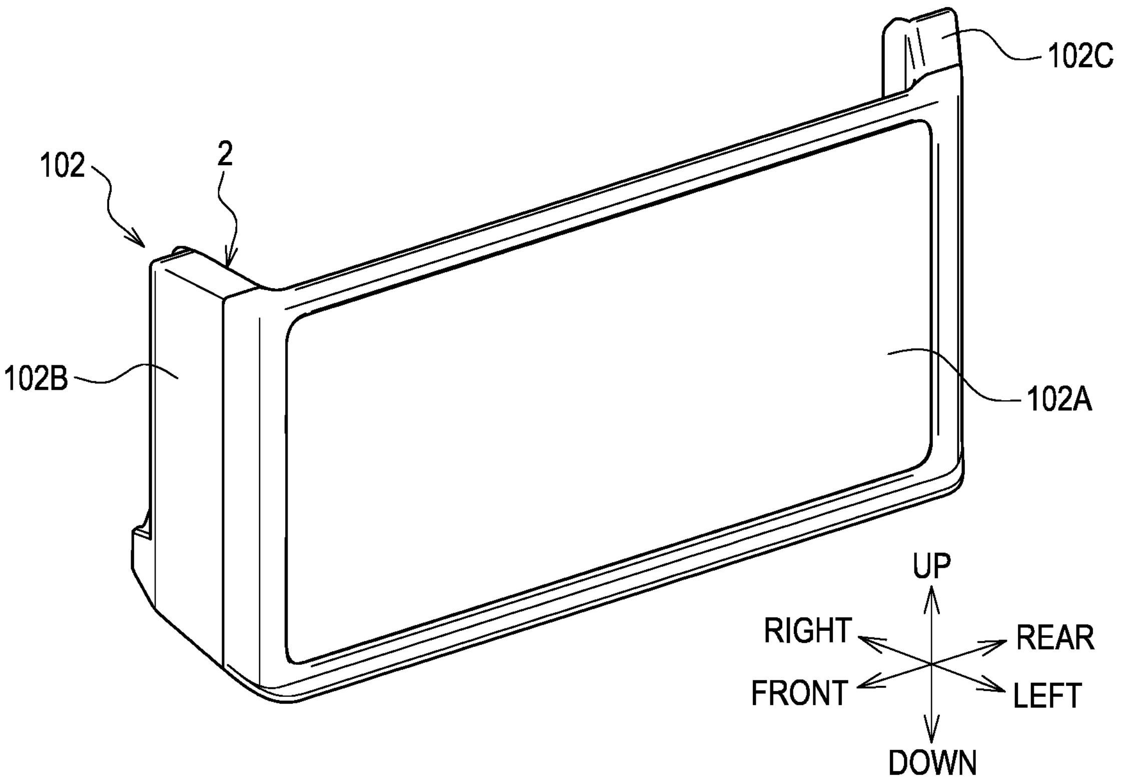
FIG. 3A and FIG. 3B are schematic perspective views of the seat table in FIG. 1.
Figure 3B:
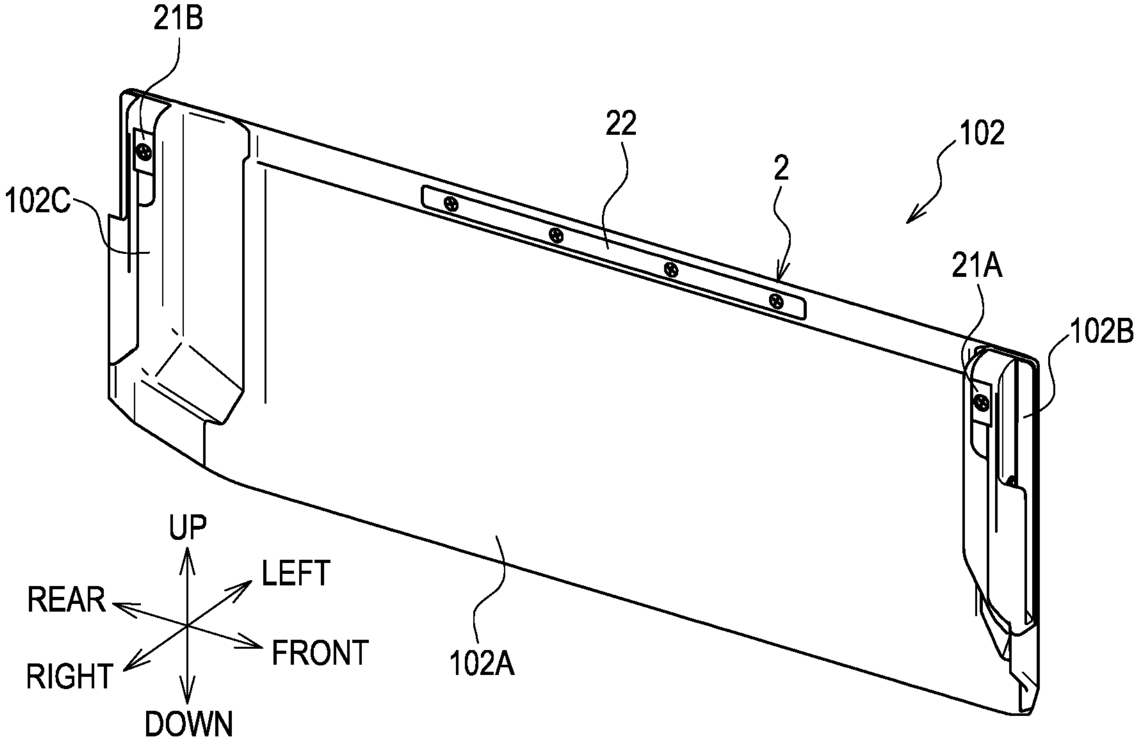

As shown in FIGS. 3A and 3B, the seat table 102 comprises a table body 102A, a first leg 102B, a second leg 102C, and the held portion 2. The directions shown in FIGS. 3A and 3B are directions as viewed in the state where the seat table 102 is stored in the first armrest 101A, which is a storage portion.

The table body 102A is a plate-shaped member having a top surface for placing an article thereon in the in-use state. The table body 102A is formed of a non-magnetic material, such as resin.

The first leg 102B extends from a front end of the table body 102A as viewed in the storage state (i.e., a state where the held portion 2 is held by the holding portion 3 of the first armrest 101A) toward a seat-width-direction inside (i.e., downward as viewed in the in-use state). The second leg 102C extends from a rear end of the table body 102A as viewed in the storage state toward the seat-width-direction inside. The first leg 102B and the second leg 102C are each formed of a non-magnetic material, such as resin.

The held portion 2 is held by the holding portion 3 provided to the first armrest 101A. The held portion 2 comprises a first attracted magnet 21A, a second attracted magnet 21B, and a metal part 22.

The first attracted magnet 21A is arranged on an upper part of a seat-width-direction inside end (i.e., a leading end) of the first leg 102B as viewed in the storage state. The second attracted magnet 21B is arranged on an upper part of a seat-width-direction inside end of the second leg 102C as viewed in the storage state.

The first attracted magnet 21A and the second attracted magnet 21B are arranged so as to be apart from each other in front-rear directions as viewed in the storage state (i.e., in a table width direction). Further, the first attracted magnet 21A and the second attracted magnet 21B are each arranged on a corresponding front-rear-directions outside relative to the table body 102A and also on the seat-width-direction inside relative to the table body 102A, as viewed in the storage state.

The metal part 22 is a strip-shaped metal plate arranged on an upper end of a surface of the table body 102A on the seat-width-direction inside as viewed in the storage state (i.e., on a bottom surface as viewed in the in-use state). The metal part 22 is arranged between the first attracted magnet 21A and the second attracted magnet 21B in the front-rear directions as viewed in the storage state.

<First Armrest>

Figure 4A:
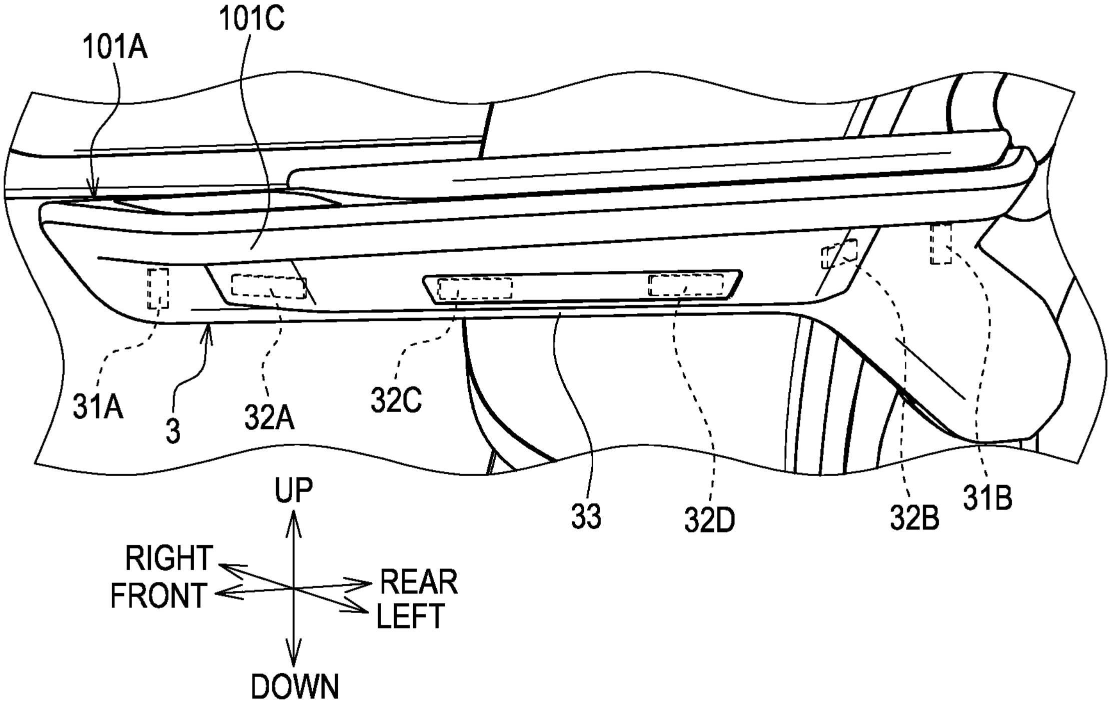
FIG. 4A is a schematic perspective view of a first armrest of the seat in FIG. 1.
Figure 4B:
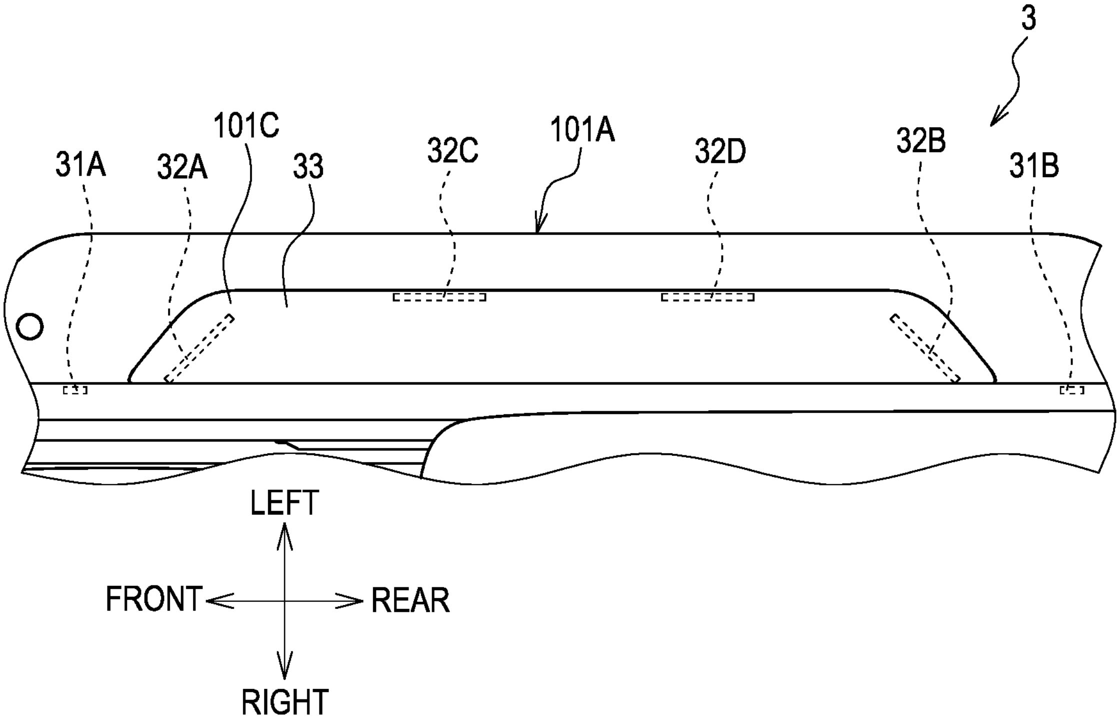
FIG. 4B is a schematic bottom view of the first armrest in FIG. 4A.

As shown in FIGS. 4A and 4B, the first armrest 101A comprises a cover 101C and the holding portion 3.

The cover 101C is a member to cover a frame and so on of the first armrest 101A, and constitutes a design of the first armrest 101A. The cover 101C is formed of a non-magnetic material, such as resin.

The holding portion 3 comprises a first attracting magnet 31A, a second attracting magnet 31B, a first repelling magnet 32A, a second repelling magnet 32B, a third repelling magnet 32C, a fourth repelling magnet 32D, and a protruding portion 33.

The first attracting magnet 31A is arranged inside the cover 101C at a front end of the first armrest 101A. The first attracting magnet 31A is arranged at a position where it can attract the first attracted magnet 21A with a part of the cover 101C held therebetween.

The second attracting magnet 31B is arranged inside the cover 101C at a rear end of the first armrest 101A. The second attracting magnet 31B is arranged at a position where it can attract the second attracted magnet 21B with a part of the cover 101C held therebetween.

The first attracting magnet 31A and the second attracting magnet 31B are arranged so as to be apart from each other in the front-rear directions. The distance between the first attracting magnet 31A and the second attracting magnet 31B is the same as the distance between the first attracted magnet 21A and the second attracted magnet 21B in the held portion 2.

The protruding portion 33 is arranged between the first attracting magnet 31A and the second attracting magnet 31B in the front-rear directions, and protrudes to a seat-width-direction outside (i.e., to the left side) relative to the first attracting magnet 31A and the second attracting magnet 31B.

In other words, the protruding portion 33 protrudes toward the held portion 2 as viewed in a state where the held portion 2 is held by the holding portion 3. The protruding portion 33 has a substantially trapezoidal shape in which the width thereof in the front-rear directions becomes smaller toward the left side as viewed in the up-down directions. A leading-end portion (i.e., the left-end portion) of the protruding portion 33 faces or contacts a back surface of the table body 102A when the seat table 102 is in a stored state.

Each of the first repelling magnet 32A, the second repelling magnet 32B, the third repelling magnet 32C, and the fourth repelling magnet 32D repels the first attracted magnet 21A and the second attracted magnet 21B.

The first repelling magnet 32A is arranged inside a portion of the cover 101C forming a front-side slope of the protruding portion 33 (i.e., a surface inclined both relative to the front-rear directions and relative to a seat-width direction). The first repelling magnet 32A is located on the frontmost side among the repelling magnets 32A through 32D, and is closest to the first attracting magnet 31A.

The second repelling magnet 32B is arranged inside a portion of the cover 101C forming a rear-side slope of the protruding portion 33. The second repelling magnet 32B is located on the rearmost side among the repelling magnets 32A through 32D, and is closest to the second attracting magnet 31B.

The third repelling magnet 32C and the fourth repelling magnet 32D are arranged inside a portion of the cover 101C forming a surface of the protruding portion 33 on the seat-width-direction outside (i.e., on a projecting end surface). The third repelling magnet 32C and the fourth repelling magnet 32D are located between the first repelling magnet 32A and the second repelling magnet 32B in the front-rear directions. The third repelling magnet 32C and the fourth repelling magnet 32D are located on the seat-width-direction outside relative to the first attracting magnet 31A and the second attracting magnet 31B.

The first attracting magnet 31A, the second attracting magnet 31B, the first repelling magnet 32A, the second repelling magnet 32B, the third repelling magnet 32C, and the fourth repelling magnet 32D are arranged in an aligned manner along the front-rear directions as viewed in the seat-width direction. In other words, there exists an imaginary plane that is perpendicular to the up-down directions and that passes through all these magnets.

Figure 5:
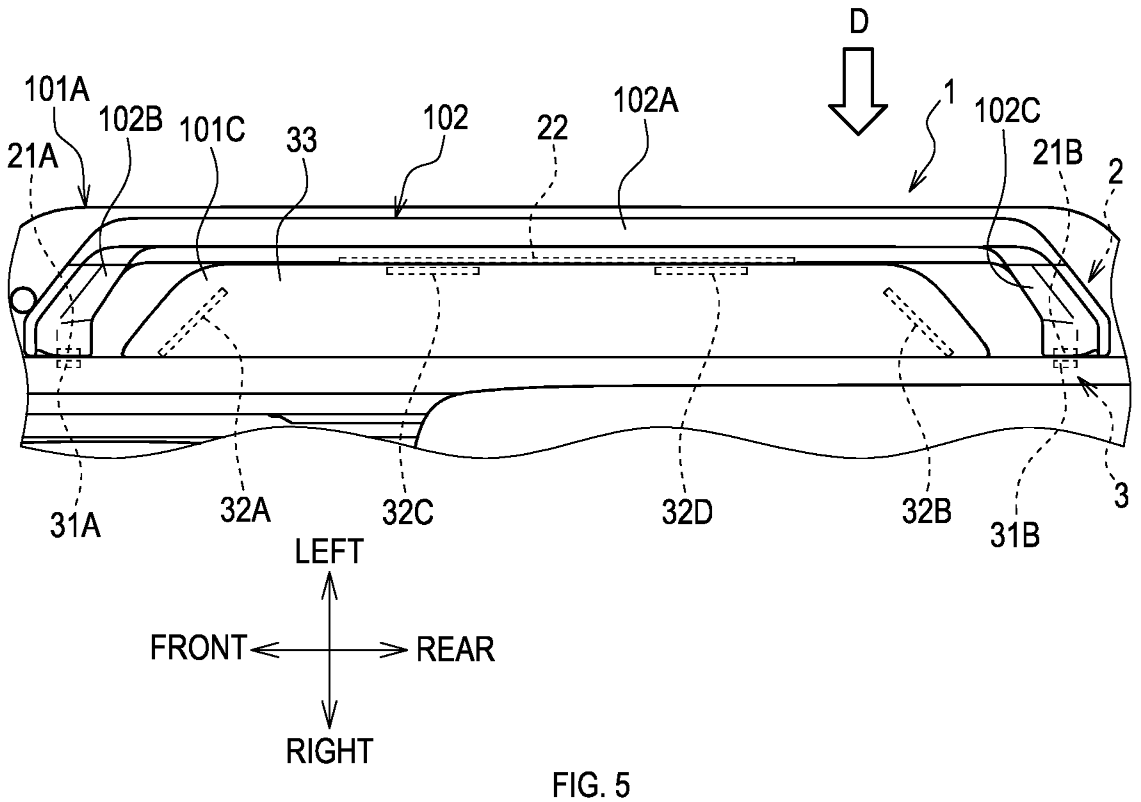
FIG. 5 is a schematic bottom view of the storage mechanism for the seat table in FIG. 1.

As shown in FIG. 5, in the state where the held portion 2 is held by the holding portion 3, the first attracted magnet 21A is attracted to the first attracting magnet 31A, and the second attracted magnet 21B is attracted to the second attracting magnet 31B. Further, in the state where the held portion 2 is held by the holding portion 3, the metal part 22 on the seat table 102 is attracted to the third repelling magnet 32C and the fourth repelling magnet 32D.

When storing the seat table 102 in the first armrest 101A, if the seat table 102 is moved in an attaching direction D with the first attracted magnet 21A deviated rearward relative to the first attracting magnet 31A, the first attracted magnet 21A is forced frontward by the first repelling magnet 32A and the third repelling magnet 32C. This results in guiding the first attracted magnet 21A toward the first attracting magnet 31A. The attaching direction D is a direction directed from the seat-width-direction outside to the seat-width-direction inside (i.e., a rightward direction).

Similarly, if the seat table 102 is moved in the attaching direction D with the second attracted magnet 21B deviated frontward relative to the second attracting magnet 31B, the second attracted magnet 21B is forced rearward by the second repelling magnet 32B and the fourth repelling magnet 32D. This results in guiding the second attracted magnet 21B toward the second attracting magnet 31B.

The seat table storage mechanism 1 may further comprise a locking mechanism for securing the held portion 2 to the holding portion 3 in the state where the seat table 102 is stored in the first armrest 101A. The locking mechanism is configured with, for example, a claw as an engaging portion and a fitting hole as an engaged portion with which the engaging portion engages.

[1-2. Effects]

The above-detailed embodiment produces the following effects:

(1*a*) Mutual attraction between the attracted magnet 21A and the attracting magnet 31A and between the attracted magnet 21B and the attracting magnet 31B results in guiding the held portion 2 of the seat table 102 to the storage position in the first armrest 101A as the storage portion.

Additionally, mutual repellence between the repelling magnets 32A to 32D and the attracted magnets 21A and 21B results in guiding the attracted magnets 21A and 21B toward the attracting magnets 31A and 31B, respectively. This enables improved handleability in storing the seat table 102 in the first armrest 101A with the relatively simple configuration.

(1*b*) Attraction of the metal part 22 to the repelling magnets 32C and 32D makes it possible to increase a force to hold the held portion 2 by the holding portion 3.

(1*c*) Arrangement of the repelling magnets 32A to 32D in the protruding portion 33 makes it possible to enhance the effect of guiding the attracted magnets 21A and 21B toward, respectively, the attracting magnets 31A and 31B by the mutual repellence between the repelling magnets 32A to 32D and the attracted magnets 21A and 21B.

(1*d*) Provision of the storage portion for storing the seat table 102 to the seat 101 makes it possible to design the held portion 2 and the holding portion 3 in parallel with designing the seat 101 and the seat table 102.

(1*e*) Designing the first armrest 101A as the storage portion for storing the seat table 102 facilitates storage and take-off of the seat table 102 while the occupant is seated. Additionally, a lower space of the first armrest 101A can be utilized effectively.

2. Other Embodiments

The embodiment of the present disclosure has been described so far; however, the present disclosure can be implemented in various forms without being limited to the above-described embodiment.

(2*a*) In the seat table storage mechanism of the above-described embodiment, the held portion does not necessarily have to comprise the metal part to be attracted to the repelling magnets.

(2*b*) In the seat table storage mechanism of the above-described embodiment, the repelling magnets do not necessarily have to be arranged in the protruding portion.

(2*c*) In the seat table storage mechanism of the above-described embodiment, the storage portion for storing the seat table does not necessarily have to be the first armrest. For example, the storage portion may be provided to the seatback. Furthermore, the storage portion for storing the seat table may be provided somewhere other than the seat. For example, the storage portion may be provided to a console, a wall, or elsewhere, arranged around the seat.

(2*d*) The function of a single element in the above-described embodiments may be performed separately by two or more elements, and the function performed by two or more elements may be performed inclusively by a single element. Part of the configuration in the above-described embodiments may be omitted. At least part of the configuration in the above-described embodiments may be added to or replace another configuration in the above-described embodiments. Any and all modes encompassed by the technical idea defined by the language of the claims are embodiments of the present disclosure.

What is claimed is:

1. A storage mechanism for a seat table used in combination with a seat, the storage mechanism comprising:
- a held portion provided to the seat table; and
- a holding portion provided to a storage portion where the seat table is stored,
- the held portion comprising at least one attracted magnet, and
- the holding portion comprising:
  - at least one attracting magnet attracting the at least one attracted magnet; and
  - at least one repelling magnet repelling the at least one attracted magnet.

2. The storage mechanism for a seat table according to claim 1,
- wherein the held portion further comprises a metal part attracted to the at least one repelling magnet in a state where the held portion is held by the holding portion.

3. The storage mechanism for a seat table according to claim 1,
- wherein the at least one attracting magnet comprises a first attracting magnet and a second attracting magnet arranged so as to be apart from each other in a first direction,
- wherein the at least one attracted magnet comprises a first attracted magnet and a second attracted magnet, the first attracted magnet and the second attracted magnet being attracted to the first attracting magnet and the second attracting magnet, respectively, in the state where the held portion is held by the holding portion, wherein the holding portion comprises a protruding portion that is arranged between the first attracting magnet and the second attracting magnet in the first direction and that protrudes toward the held portion relative to the first attracting magnet and the second attracting magnet in the state where the held portion is held by the holding portion, and wherein the at least one repelling magnet is arranged in the protruding portion.

4. The storage mechanism for a seat table according to claim 1, wherein the storage portion is provided to the seat.

5. The storage mechanism for a seat table according to claim 4, wherein the storage portion is an armrest of the seat.

* * * * *